A. SUNDH.
SPEED CHANGING APPARATUS.
APPLICATION FILED OCT. 12, 1911.

1,134,772.

Patented Apr. 6, 1915.

WITNESSES:
Arthur Trezise Jr.
James G. Bothell.

August Sundh
INVENTOR

BY L. H. Campbell
ATTORNEY

UNITED STATES PATENT OFFICE.

AUGUST SUNDH, OF HASTINGS-UPON-HUDSON, NEW YORK, ASSIGNOR TO OTIS ELEVATOR COMPANY, OF JERSEY CITY, NEW JERSEY, A CORPORATION OF NEW JERSEY.

SPEED-CHANGING APPARATUS.

1,134,772.　　　　　　Specification of Letters Patent.　　　Patented Apr. 6, 1915.

Application filed October 12, 1911. Serial No. 654,228.

*To all whom it may concern:*

Be it known that I, AUGUST SUNDH, a citizen of the United States, residing at Hastings-upon-Hudson, in the county of Westchester and State of New York, have invented a new and useful Improvement in Speed-Changing Apparatus, of which the following is a specification.

My invention relates to speed changing mechanism involving spur gearing, and means in connection therewith to reduce the noise of the gearing when operating to a minimum.

The invention apprehends the use of a train of spur gearing placed within a driven element, such as an elevator sheave, a belt sheave, a friction clutch or other device. The gearing when placed within a sheave, clutch, or the like, requires practically no independent space whereby considerable economy in space which would otherwise be required for speed reduction mechanism is effected. In general with machinery where it is desired to have the speed either reduced or increased, pulleys or clutch mechanisms are ordinarily employed. With the present invention, the gearing for changing the speed can be put directly within such pulley or clutch mechanism and thereby reduce the amount of space required. This is of considerable practical importance in connection with elevators and other apparatus where the allotted space for the installation is often limited.

The accompanying drawings illustrate a specific embodiment of the invention.

Figure 2:
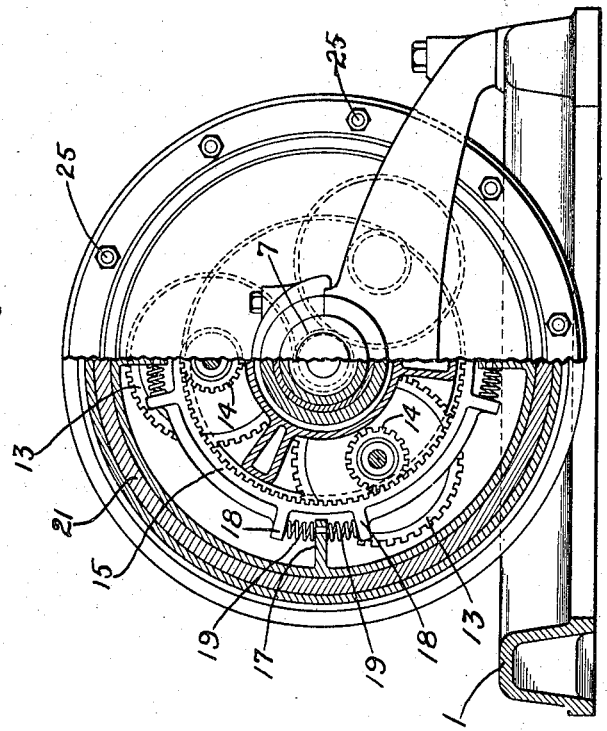
Figure 1:
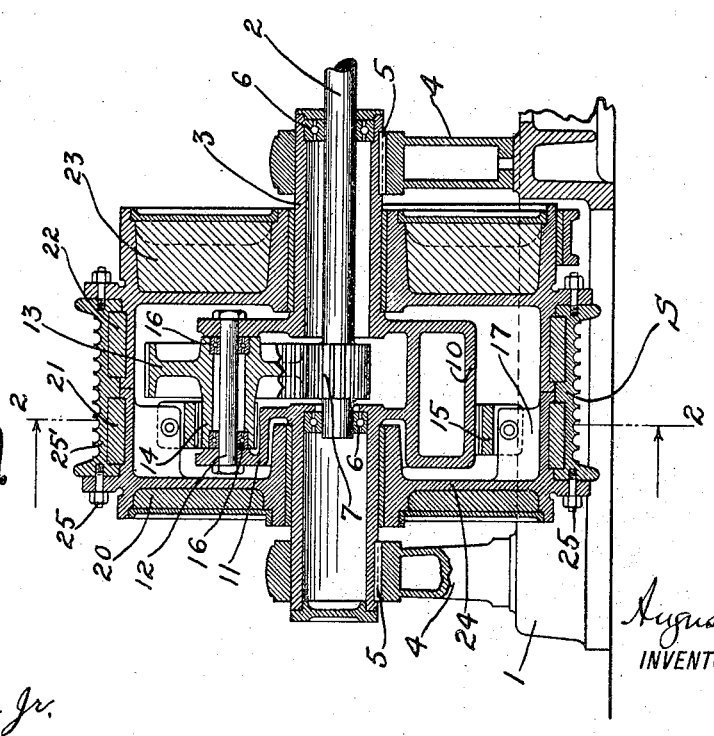

Figure 1 is a part sectional side elevation of the mechanism; Fig. 2 is a part sectional end elevation as indicated by the section line 2—2 on Fig. 1.

The mechanism as herein shown, comprises a bedplate 1 having a drive shaft 2 extending into a hollow stationary shaft 3. The latter is supported in standards 4 mounted on the bedplate 1. The hollow shaft 3 is held against rotation by means of keys 5. Ball bearings 6 are placed between the hollow shaft 3 and the drive shaft 2. A sheave or drum S is rotatably mounted on the hollow shaft 3 and is driven by means of a train or trains of spur gearing located within the sheave and connecting the latter with the drive shaft 2. The hollow shaft 3 comprises two sections connected by integral ribs 10. Flanges 11 are also formed on the inner ends of the hollow shaft. Pivot rods 12 extend between these flanges and on said rods are mounted spur gears 13 meshing with the pinion 7. The hubs of the gears 13 are extended and provided with gear teeth to form pinions 14 which mesh with an annular gear 15. Ball bearings 16 are preferably interposed between the rods 12 and the gears mounted thereon. The sheave S is provided with internal lugs or plates 17 which extend between pairs of lugs 18 formed on the periphery of the annular gear 15. Coil springs 19 are interposed between the lugs 17 and 18, and form a yielding connection between the sheave S and the annular gear. The hollow sheave S is preferably filled or partly filled with oil.

When the drive shaft 2 is rotated, the self-alining pinion 7 drives the three gear wheels 13 and the pinions 14 integral with said gears to transmit motion with reduced speed to the annular gear 15. The latter through the yielding connections above described rotates the sheave S. The sheave S is formed with double walls so as to provide spaces 20, 21, 22, 23, which may be filled with any suitable noise deadening material, or may be left simply as dead air spaces. This forms a means for muffling or deadening the sound of the gearing. The outer wall or face 24 of the sheave S is removably secured in place by bolts 25. A ring 25′ is also preferably made in sections so as also to be removable after the bolts 25 have been removed. This arrangement permits of easy access to the gearing within the sheave. That is, a support may be placed under the sheave and the standard 4 and rear face plate 24 of the sheave removed without removing the driving cables from the sheave. The gearing within the sheave can then be examined or repaired as may be necessary. This arrangement by which the gearing is readily accessible is of great advantage in connection with elevators and the like, where, on account of the requirements of insurance companies or for other reasons frequent inspections of the mechanism are necessary.

It will be understood that my invention is applicable to various forms of apparatus other than elevators and is described in connection with an elevator merely to illustrate one of the practical uses to which it may be put.

Various modifications in the details of construction and arrangement of parts might also be employed without departing from the spirit and scope of my invention. I wish therefore not to be limited to the particular form of apparatus disclosed.

What I claim as new and desire to secure by Letters Patent of the United States is:

1. The combination of a driving sheave and spur gearing within the sheave and connected to drive the same, said sheave being formed with hollow walls which serve to deaden the noise generated by the spur gearing.

2. The combination of a driving sheave, and power transmitting mechanism within the sheave, said sheave being formed with hollow walls to muffle the sound produced by the driving mechanism, the said sheave comprising an independently removable ring extending around the sheave and forming a part of the said hollow wall.

In testimony whereof, I have signed my name to this specification in the presence of two subscribing witnesses.

AUGUST SUNDH.

Witnesses:
JAMES G. BETHELL,
J. F. RULE.